United States Patent
Brown

(10) Patent No.: US 6,733,884 B2
(45) Date of Patent: May 11, 2004

(54) POLYMER COMPOUND CONTAINING SILICON ESTER MOIETY AND COMPOSITION THEREFROM

(75) Inventor: Ward Thomas Brown, North Wales, PA (US)

(73) Assignee: Rohm and Haas Company, Philadelphia, PA (US)

(*) Notice: Subject to any disclaimer, the term of this patent is extended or adjusted under 35 U.S.C. 154(b) by 4 days.

(21) Appl. No.: 10/197,795

(22) Filed: Jul. 18, 2002

(65) Prior Publication Data

US 2003/0017348 A1 Jan. 23, 2003

Related U.S. Application Data

(60) Provisional application No. 60/386,730, filed on Jun. 10, 2002, and provisional application No. 60/306,929, filed on Jul. 20, 2001.

(51) Int. Cl.$^7$ ............... B32B 19/00; B32B 9/04; B32B 27/30; C08G 77/00
(52) U.S. Cl. ............... 428/404; 428/407; 428/447; 428/450; 428/523; 428/702; 528/25; 528/26; 528/27; 528/28; 528/30; 528/32; 528/43
(58) Field of Search ............... 428/446, 447, 428/448, 500, 523, 450, 688, 689, 702, 357, 402, 403, 404, 407; 528/25, 30, 26, 27, 28, 32, 43; 524/547, 858, 859; 525/326.5

(56) References Cited

U.S. PATENT DOCUMENTS

| | | |
|---|---|---|
| 3,655,633 A | 4/1972 | Saam ............... 260/79 |
| 4,061,503 A | 12/1977 | Berger et al. |
| 4,070,414 A | 1/1978 | Falender et al. |
| 4,136,080 A | 1/1979 | Berger |
| 4,151,154 A | 4/1979 | Berger |
| 4,981,937 A | 1/1991 | Kuriyama et al. ........... 526/328 |
| 5,032,455 A | 7/1991 | Dana et al. |
| 5,705,561 A * | 1/1998 | Kozakiewicz et al. ...... 524/730 |
| 6,069,200 A * | 5/2000 | Chen et al. ............... 524/547 |
| 6,414,077 B1 * | 7/2002 | Barron et al. ............... 524/588 |

OTHER PUBLICATIONS

Journal of Polymer Science: Part A–1, vol. 8, 2509–2516 (1970).

Co–pending application, Ser. No. 10/174,158.

* cited by examiner

Primary Examiner—Philip Tucker
Assistant Examiner—Michael J Feely
(74) Attorney, Agent, or Firm—Gary D. Greenblatt

(57) ABSTRACT

A polymer compound having a silicon ester moiety is provided. The silicon ester moiety is located at one end of the polymer compound. The polymer compound contains as polymerized units ethylenically unsaturated monomer and at least one functional group that is pendant to the polymer backbone of the polymer compound. The polymer compound is useful for modifying the surface properties of inorganic substrates. Also provided are a method of preparing the polymer compound and an inorganic substrate that has been treated with the polymer compound.

16 Claims, No Drawings

POLYMER COMPOUND CONTAINING SILICON ESTER MOIETY AND COMPOSITION THEREFROM

CROSS REFERENCE TO RELATED PATENT APPLICATIONS

This is a non-provisional application of prior U.S. provisional applications Ser. No. 60/386,730 filed Jun. 10, 2002 and Ser. No. 60/306,929 filed Jul. 20, 2001, now abandoned, under 37 CFR 1.78(a)(4).

This invention relates generally to a polymer compound having a silicon ester moiety. In particular, the polymer compound has a group containing a silicon ester moiety located at one end of the polymer compound. Further, the polymer compound also contains functional groups that are pendant to the backbone of the polymer compound. The polymer compound is useful as a coupling agent for treating the surfaces of inorganic substrates to modify the surface properties or to provide inorganic surfaces with functional groups. Also provided is a process for preparing the polymer compound.

Silane coupling agents are widely used to improve the properties of materials containing interfaces between an inorganic substance and an organic substance, such as polymeric coatings applied onto metal or metal oxide surfaces, or polymeric coatings having inorganic pigment particles dispersed within. Treatment of inorganic surfaces with silane coupling agents improves the interfacial bond between the inorganic material and the organic material, resulting, for example, in coatings with better adhesion to metal oxide surfaces or improved compatibility of inorganic particles in a polymer. Silane coupling agents are characterized as containing hydrolyzable silane groups attached to an organic group. The hydrolyzable silane groups react to form covalent bonds with the surface of an inorganic substance, attaching organic groups to the inorganic substance, and thus modifying the surface properties of the inorganic substance. The attached organic group typically provides improved compatibility with organic materials such as polymers. Silane coupling agents are employed for modifying the surface characteristics of inorganic particles to provide better dispersibility into plastics.

For example, U.S. Pat. No. 4,061,503 discloses the treatment of titanium dioxide particles with a polyether substituted silicon compound as the coupling agent. The polyether substituted silicon compound contains a hydrolyzable silicon group attached to a polyalkylene oxide group. The titanium dioxide treated with the polyether substituted silicon compound is disclosed to have improved compatibility or dispersibility within a plastic or resin system. However, the polyether substituted silicon compounds are not disclosed to form covalent bonds with the plastic or resin system.

Coupling agents are desired that can provide covalent bonding between the interface of an inorganic material and an organic material. The formation of covalent bonding between the inorganic-organic interface allows the formation of composites having improved properties, compared to composites based on weaker molecular interactions, such as compatibility arising from dispersion forces or hydrogen bonding.

In the present invention, a polymer compound is provided having a reactive group for forming a covalent bond to an inorganic substrate and at least one functional group, which is capable of reacting with a second substrate, such as a polymer, having a complementary functional group to form a covalent bond with the second substrate. The polymer compound has an organic polymer component that is prepared from ethylenically unsaturated monomer and has at least one functional group pendant to the backbone of the organic polymer component. The polymer compound is useful for modifying the surface properties of inorganic materials, such as providing inorganic particles with improved water dispersibility, and for forming composite particles containing inorganic particles surrounded by covalently bonded polymer particles. The composite particles prepared with the polymer compound of this invention are useful in coatings, especially to provide coatings that have improved hiding compared to conventional coatings.

According to the first aspect of the present invention, a polymer compound is provided containing an organic polymer component having ethylenically unsaturated monomers as polymerized units and having at least one pendant functional group; and a semi-telechelic group having a silicon ester moiety and a sulfur atom forming a bond to the organic polymer component.

A second aspect of the present invention provides a process for preparing a polymer compound including the steps of preparing a reaction mixture comprising at least one ethylenically unsaturated monomer having a functional group and a mercaptan compound having a silicon ester moiety; polymerizing the reaction mixture to form the polymer compound; wherein the polymer compound contains an organic polymer component containing, as polymerized units, the ethylenically unsaturated monomer having a functional group; and a semi-telechelic group formed from the mercaptan compound, and having a sulfur atom forming a bond to the organic polymer component.

A third aspect of the present invention provides a surface-treated inorganic substrate including an inorganic substrate having a surface; and a residue of a polymer compound containing an organic polymer component having ethylenically unsaturated monomers as polymerized units and having at least one pendant functional group; and a semi-telechelic group having: a sulfur atom forming a bond to the organic polymer component, and at least one reacted silanol group forming a covalent bond with the surface of the inorganic substrate.

As used herein, the term "(meth)acrylate" refers to either acrylate or methacrylate and the term "(meth)acrylate" refers to either acrylic or methacrylic.

A covalent bond is a bond between two atoms formed by sharing at least one pair of electrons and expressly excludes ionic bonds, bonds formed by adsorption including chemical adsorption and physical adsorption, van der Waals bonds, or bonds formed by dispersion forces.

The polymer compound of the present invention includes a polymer chain, referred to herein as the "organic polymer component", and a group attached to one end of the organic polymer component, referred to herein as the "semi-telechelic group". The semi-telechelic group bears at least one silicon ester moiety. The polymer compound is characterized by the following general formula:

wherein Q is the organic polymer component, A—L—S is the semi-telechelic group, A is the silicon ester moiety, L is a linker group, and S is a sulfur atom. In the presence of water, the silicon ester moiety reacts to form at least one silanol group. The silanol group is reactive with inorganic surfaces such as metal and metal oxide surfaces and forms a covalent bond with the inorganic surface to adhere the reacted polymer compound onto the inorganic surface. The attachment of the reacted polymer compound to the inorganic surface allows the modification of the surface properties of the inorganic surface.

The semi-telechelic group contains the linker group and at least one silicon ester moiety. The semi-telechelic group also contains a sulfur atom, which provides a bond between the linker group and the end of the organic polymer component. The linker group contains at least one carbon atom and is typically a divalent group, which is either oxygen or carbon bonded to the silicon atom of the silicon ester moiety. Preferred is a linker group that is carbon bonded to the silicon atom of the silicon ester moiety. Suitable linker groups include alkenyl groups such as:

—CH$_2$—
—CH$_2$—CH$_2$—
—CH$_2$CH$_2$CH$_2$—
—CH(CH$_3$)CH$_2$— and aryl groups such as:

—CH$_2$—C$_6$H$_4$—CH$_2$CH$_2$—

The bond between the linker group and the silicon ester moiety is materially stable to hydrolysis under the conditions employed to hydrolyze the silicon ester moiety to form silanol. The semi-telechelic group contains one or more silicon ester moieties. Preferred is a semi-telechelic group having one silicon ester moiety.

The silicon ester moiety has an oxygen atom forming a bond between a silicon atom and an organic group and is characterized by the following general formula:

$$(R^1O)_n(R^2)_{3-n}Si—$$

wherein R$^1$ and R$^2$ are organic groups containing at least one carbon atom, and n has an integer value in the range of 1 to 3. Examples of R$^1$ include alkyl groups such as methyl, ethyl, and propyl groups; and acyloxy groups such as H$_3$CC(O)— and H$_3$CH$_2$C(O)—. The R$^1$ organic groups as well as the R$^2$ organic groups are independently selected. For example, suitable silicon ester moieties includes mixed esters such as (CH$_3$O)(C$_2$H$_5$O)$_2$Si— and (CH$_3$O)(C$_2$H$_5$O)(CH$_3$)Si—; and mixed monoesters such as (CH$_3$O)(C$_2$H$_5$)(CH$_3$)Si— and (CH$_3$O)(C$_6$H$_5$CH$_2$)(CH$_3$)Si—. Suitable silicon ester moieties include mono-, di-, and triesters, such as mono-, di-, and tri-alkoxysilane groups; mono-, di-, and tri-acyloxysilane groups, and mono, di, and tri-aryloxysilane groups. Silicon triesters are preferred. In the presence of moisture, the silicon ester group undergoes hydrolysis to form silanol. Silicon diesters and silicon triesters undergo either partial or complete hydrolysis to form one or more silanols, wherein each silanol is capable of forming a covalent bond with an inorganic surface. The degree of hydrolysis depends upon various factors including the hydrolysis conditions such as the pH and the size of the ester group. A preferred silicon ester group is an alkoxysilane group having 1 to 3 carbon atoms. Methyl and ethyl esters are more preferred.

Examples of the semi-telechelic group includes:

(CH$_3$O)$_3$Si—CH$_2$CH$_2$CH$_2$—S—,
(CH$_3$CH$_2$O)$_3$Si—CH$_2$CH$_2$CH$_2$—S—,
(CH$_3$CH$_2$O)$_2$(CH$_3$)Si—CH$_2$—S—
(CH$_3$O)$_2$(CH$_3$)Si—CH$_2$CH$_2$CH$_2$—S—,
(CH$_3$C(O)O)$_3$Si—CH$_2$CH$_2$CH$_2$—S—, and
(CH$_3$O)(CH$_3$)$_2$Si—C$_6$H$_4$—CH$_2$—S—.

The organic polymer component is a polymer chain that is characterized as containing ethylenically unsaturated monomers as polymerized units and having at least one functional group pendant to the polymer backbone. The polymer compound is prepared by the addition polymerization of at least one ethylenically unsaturated monomer that has a functional group or a precursor to a functional group, referred to herein as "first monomer". The polymer compound polymerized from a reaction mixture containing only one type of first monomer, results in the formation of a homopolymer. Alternatively, the polymer compound polymerized from a reaction mixture containing two different first monomers or a first monomer and a monomer that is not a first monomer, referred to herein as "second monomer", results in the formation of a copolymer. Copolymer also includes polymers containing as polymerized units the first monomer and two or more different second monomers, and polymers containing two different first monomers and one or more different second monomers. The arrangement of the polymerized monomers in the copolymer include polymers having a random sequence of reacted monomer units, and polymers having nonrandom sequences such as block copolymers. In one embodiment, the polymer compound is prepared by first polymerizing a first monomer having a group that is a precursor to a functional group. After polymerization, the polymer compound is obtained by converting the precursor group to the pendant functional group. An example of a precursor group is an alkyl ester group, which is subsequently hydrolyzed to form an acid group.

The organic polymer component contains at least one and optionally, two or more different functional groups, which are pendant to the backbone of the polymer chain. Examples of suitable functional groups include carboxylic acid; anhydride; alcohol; thiols; aldehyde; amines such as primary, secondary, and tertiary amines; amides; epoxides; thioranes; aziridines; halogens such as bromine and chlorine; isocyanates; carbodiimides; isothiocyanates; and acetoacetoxy groups. Other suitable functional groups include phosphorus-containing acids, which refer to groups having a POH moiety in which the hydrogen atom is ionizable. Also included in the term "phosphorus-containing acids" are salts of these acids. Examples include groups formed from phosphinic acid, phosphonic acid, phosphoric acid, pyrophosphinic acid, pyrophosphoric acid, partials esters thereof, and salts thereof. Further, other suitable functional groups include sulfur-containing acids, which refer to groups having a SOH moiety in which the hydrogen atom is ionizable. Also included in the term "sulfur-containing acids" are salts of these acids. Examples include groups formed from sulfuric acid and sulphorous acid. Alkyl ester groups are expressly excluded as a functional group.

Suitable first monomers include isocyanate monomers such as isocyanatoethyl methacrylate and dimethyl metaisopropenyl benzyl isocyanate; acetoacetoxy monomers such as acetoacetoxy ethyl (meth)acrylate; aldehyde monomers such as acrolein and methacrolein; amine monomers such as t-butyl aminoethyl (meth)acrylate, aminopropyl (meth)acrylate, dimethyl aminoethyl (meth)acrylate, aminobutyl (meth)acrylate, aminoethyl (meth)acrylate; amide monomers such (meth)acrylamide; and oxazolidinoethyl (meth)acrylate; epoxy monomers such as glycidyl (meth)acrylate; hydroxy containing monomers such as hydroxyalkyl (meth) acrylates including 2-hydroxyethyl (meth)acrylate and 3-hydroxypropyl (meth)acrylate; halogenated monomers such as 2-bromoethyl (meth)acrylate and bromopropyl (meth)acrylate; and halomethyl-styrene, carboxylic acid monomers such as (meth)acrylic acid, itaconic acid, and maleic acid; monomers having phosphorus-containing acids such phosphoethyl (meth)acrylate, vinyl phosphonic acid, allyl phosphoric acid, 2-acrylamide-2- methylpropanephosphonic acid, α-phosphonostyrene, 2-methacrylamido-2-metylpropanephosphonic acid, and salts thereof; and monomers having sulfur-containing acids such as vinyl sulfonic acid, methallylsulfonic acid, styrene sulfonic acid, N-(2-sulfo1,1-dimethylethyl)acrylamide, 2-acrylamido-2-methylpropanesulfonic acid, and salts thereof.

A wide range of ethylenically unsaturated monomers are suitable as the optional second monomer, including styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, various $C_1$–$C_{40}$ alkyl esters of (meth) acrylic acid; for example, methyl (meth)acrylate, ethyl (meth)acrylate, n-butyl (meth)acrylate, 2-ethylhexyl (meth) acrylate, cyclohexyl (meth)acrylate, n-octyl (meth)acrylate, n-dodecyl (meth)acrylate, cyclopentyl (meth)acrylate, lauryl (meth)acrylate, and stearyl (meth)acrylate; other (meth) acrylates such as isobornyl (meth)acrylate, benzyl (meth) acrylate, phenyl (meth)acrylate, 2-phenylethyl (meth) acrylate, and 1-naphthyl (meth)acrylate, and alkoxyalkyl (meth)acrylate, such as ethoxyethyl (meth)acrylate.

The degree of polymerization of the organic polymer component is at least 3, preferably at least 10, and more preferably at least 25. A suitable range for the degree of polymerization is in the range of from 3 to 1,000, preferably in the range of from 10 to 250, and more preferably in the range of from 25 to 100. The degree of polymerization of the polymer compound is the average degree of polymerization calculated by dividing the number of moles of first monomer and second monomer used to polymerize the polymer compound by the number of moles of mercaptan compound, which contains the silicon ester moiety.

The polymer compound is prepared by polymerizing ethylenically unsaturated monomers in the presence of a mercaptan compound having at least one silicon ester moiety. The mercaptan compound acts as a chain transfer agent and affects the degree of polymerization of the organic polymer component. The resulting organic polymer component has the reacted mercaptan compound attached onto one end of its polymer chain. The reacted mercaptan compound forms the semi-telechelic group and the polymer chain forms the organic polymer component of the polymer compound of this invention.

Suitable mercaptan compounds for preparing the polymer compound have the general formula:

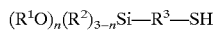

$(R^1O)_n(R^2)_{3-n}Si-R^3-SH$ wherein $R^1$ and $R^2$ are organic groups containing at least one carbon atom, $R^3$ is a divalent organic group such as an alkylene group containing 1 to 20 carbons, and n has an integer value in the range of 1 to 3. Examples of suitable mercaptan compounds include, but are not limited to 3-mercaptopropyl methyldimethoxysilane, mercaptomethyl methyldiethoxysilane, 3-mercaptopropyl triethoxysilane, and 3-mercaptopropyl trimethoxylsilane.

Various polymerization processes are suitable to prepare the polymer compound from a reaction mixture containing the mercaptan compound having at least one silicon ester moiety, at least one first monomer, and optionally, at least one second monomer. The level of water in the reaction mixture is sufficiently low such that hydrolysis of silicon ester moieties or crosslinking reactions between the silicon ester moieties do not materially occur. Suitable polymerization processes include nonaqueous solution polymerization, nonaqueous emulsion polymerization, and bulk polymerization. Typically, these polymerization processes are conducted as batch, semicontinuous, continuous processes, or combinations thereof.

A preferred process to prepare the polymer compound of this invention is solution polymerization utilizing an organic solvent such as ethanol, butyl acetate, isopropanol, toluene, xylene, methyl isobutyl ketone, 2,2,4-trimethyl-1,3-pentanediol isobutyrate, methyl amyl ketone, ethylene glycol butyl ether, diethylene glycol butyl ether, propylene glycol monomethyl ether acetate, and dipropylene glycol monomethyl ether.

Typically a polymerization initiator is used in preparing the polymer compound. Suitable polymerization initiators include initiators which thermally decompose at the polymerization temperature to generate free radicals. Examples of free radical-generating initiators include persulfates, such as ammonium or alkali methal (potassium, sodium, or lithium) persulfate; azo compounds such as 2,2'-azobis (isobutyronitrile), 2,2'-azobis(2,4-dimethylvaleronitrile), and 1-t-butyl azocyanocyclohexane; hydroperoxides such as t-butyl hydroperoxide and cumene hydroperoxide; peroxides such as benzoyl peroxide, capryl peroxide, di-t-butyl peroxide, ethyl 3,3'-di(t-butylperoxy)butyrate, ethyl 3,3'-di (t-amylperoxy)butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl) peroxy dicarbonate; and perphosphates. Polymerization initiators are typically used alone or as the oxidizing component of a redox system, which also includes a reducing component such as ascorbic acid, maleic acid, glycolic acid, oxalic acid, lactic acid, thioglycolic acid, or an alkali metal sulfite, more specifically a hydrosulfite, hyposulfite, or metabisulfite, such as sodium hydrosulfite, potassium hyposulfite, and potassium metabisulfite, or sodium formaldehyde sulfoxylate Suitable levels of the initiator and the optional reducing component include from 0.001 weight % to 5 weight % each, based on the weight of the ethylenically unsaturated monomers in the monomer mixture to be polymerized. Accelerators such as chloride and sulfate salts of cobalt, iron, nickel, or copper are alternatively used in small amounts. Examples of redox catalyst systems include t-butyl hydroperoxide/sodium formaldehyde sulfoxylate/Fe(II), and ammonium persulfate/sodium bisulfite/sodium hydrosulfite/ Fe(II). The polymerization temperatures include temperatures in the range of from 20° C. to about 120° C.

The polymer compound is useful for modifying the surface properties of inorganic substrates. In this application, the polymer compound is reacted with an inorganic substrate to attach the reacted polymer compound to the surface of the inorganic substrate, thus modifying the surface composition of the inorganic substrate. A process of preparing the surface-treated inorganic substrate includes contacting the polymer compound with the surface of the inorganic substrate, optionally in the presence of an acid or base. The silicon ester moiety reacts to form a covalent bond with the inorganic substrate, thus attaching one end of the reacted polymer compound to the inorganic substrate. The reaction of the silicon ester moiety typically occurs in the presence of moisture, which leads to the hydrolysis of the silicon ester and the formation of one or more silanol groups. The silanol groups are reactive with the inorganic substrate and form a bond represented by the structure —M—O—Si—, wherein M is a metal atom in the inorganic substrate. Suitable metal atoms include, but are not limited to, titanium, aluminum, zirconium, silicon, zinc, chromium, tin, iron, and lead. The silanol groups are believed to be reactive with inorganic substrates having metal atoms at or near the surface and alternatively, with inorganic substrates having an oxide layer at or near the surface. The treated inorganic substrate is optionally dried with the application of heat or allowed to dry.

Alternatively, the polymer compound is prehydrolyzed prior to contacting with the inorganic substrate. In this process, the polymer compound is contacted with moisture, and after partial or complete hydrolysis of the silicon ester moiety, the prehydrolyzed polymer compound is contacted with the inorganic substrate.

Time periods for the completion of the reaction of the polymer compound with the inorganic substrate vary widely, depending upon many factors including the concentrations of polymer compounds and water, the surface area of the inorganic substrate, temperature, and the pH of an optional aqueous phase. Typical time periods are from seconds to days. Techniques such as silicon nuclear magnetic resonance and infrared spectroscopy are suitable for monitoring the extent of reaction of the polymer compound with the inorganic substrate.

The surface-treated inorganic substrate, which is formed by the reaction of the polymer compound with an inorganic substrate, has the residue of the polymer compound covalently bonded to the surface of the inorganic substrate. The residue of the polymer compound has at least one reacted silanol group forming a bond with the inorganic substrate and also has at least one pendant functional group. The surface-treated inorganic substrate is useful for preparing materials having inorganic-organic interfaces, such as a dried polymeric coating on a metal surface and a polymer matrix containing inorganic particles, such as pigment, filler, and extender particles in a dried paint film. The polymer compound of this invention is also useful for treating glass, including glass fibers, to provide better adhesion to an organic phase, such as a polymer.

Suitable inorganic substrates are characterized as having a surface which is reactive to silanol groups and allow the formation of covalent bonds to the inorganic substrate. Suitable inorganic substrates include substrates having a uniform composition and substrates having a heterogeneous composition with two or more phases, such as core/shell inorganic particles having a shell completely or incompletely encapsulating the core; core/shell inorganic particles having more than one core; dipolar inorganic particles; and inorganic particles having multiple domains of one phase on the surface of the other phase. Inorganic particles such as titanium dioxide particles may have a single coating or multiple coatings of silica, alumina, or zirconia. For example, titanium dioxide particles suitable for use in paints typically have a coating of silica and a coating of alumina. Suitable inorganic substrates have surfaces containing metals, metal oxides, sulfides, salts, nonmetals, nonmetal sulfides, and nonmetal oxides. The surface of the inorganic substrate includes the native surface of the inorganic substrate and surfaces having a surface treatment that provides a suitable surface for formation of covalent bonds. The covalent bond is formed with an atom in the surface of the inorganic substrate which includes any optional coating or surface treatment. In the presence of water, the surface of the inorganic substrate may have hydroxyl groups.

In one embodiment, a composite is prepared by contacting the surface-treated inorganic substrate having pendant functional groups with a second substance having complementary functional groups. Reaction of the pendant functional groups and the complementary functional groups provides a composite having covalent bonding between the inorganic substrate and the second substance. The covalent bonding provides interfaces having improved resistance to phase separation, for example, phase separation as a result of heating. The covalent bonding between the inorganic substrate and the organic substrate also provides improved adhesion between the materials. Pendant functional groups suitable for reaction with the complementary functional groups include, for example, isocyanate or isothiocyanate groups, which are reactive with a complementary functional group selected from alcohols, amines, ureas, or anhydrides; aldehyde groups, which are reactive with a complementary functional group selected from acetoacetoxy or amines; acetoacetoxy groups, which are reactive with a complementary functional group selected from aldehydes or amines; epoxide, thiorane, or aziridine groups, which are reactive with a complementary functional group selected from alcohols, carboxylic acids, anhydrides, amines, or mercaptans; carbodiimide groups, which are reactive with a complementary functional group selected from carboxylic acids, alcohols, amines, and mercaptans; haloalkane or halomethylphenyl groups, which are reactive with a complementary functional group selected from amines and carboxylic acids; amines or thiols, which are reactive with a complementary functional group selected from epoxides, aziridines, thioranes, acetoacetoxy groups, isocyanates, isothiocyanates, and carbodiimides; and carboxylic acids, which are reactive with a complementary functional group selected from epoxides, aziridines, thioranes, and carbodiimides.

The reaction between the pendant functional group and a suitable complementary functional group is optionally conducted in the presence of a catalyst. For example, tertiary amines and tin salts are suitable catalysts for the reaction between an isocyanate group as the pendant functional group and an alcohol as the complementary functional group. Conventional analytical techniques such as infrared spectroscopy, nuclear magnetic resonance spectroscopy, and ultraviolet-visible spectroscopy are suitable to determine the extent of reaction of the pendant functional group and the complementary functional group.

In one embodiment, the polymer compound of this invention is employed to prepare composite particles. A composite particle has a single center particle surrounded by a plurality of secondary particles. The center particle is an inorganic particle and the secondary particles are polymer particles. In this embodiment, the polymer compound is employed to prepare composite particles wherein the polymer particles are covalently bonded to the surface of the inorganic particle. The polymer particles are indirectly attached to the inorganic particle through a linkage formed from the polymer compound. The linkage has a covalent bond with the inorganic particle and a second covalent bond with the polymer particle. These composite particles are useful in pigmented coating compositions, such as paints to provide increased levels of hiding to the dried coating. Alternatively, the use of these composite particles allows the preparation of the dried coatings having a desired level of hiding, but requiring lower levels of titanium dioxide than conventional dried coatings. Composite particles prepared using the polymer compound of this invention are also useful for providing inorganic particles, such as pigments, fillers, and extenders, with improved dispersion into and compatibility with a polymeric matrix.

Suitable shapes for the inorganic particles for preparing the composite particle include spherical shapes such a sphere, an oblate sphere, a prolate sphere, and an irregular sphere; cubic shapes such as a cube and a rhombus; platelike shapes including a flat plate, a concave plate, and a convex plate; and irregular shapes. In a coating composition, inorganic particles having spherical shapes generally have average particle diameters in the range of 10 nanometers (nm) to 10 microns, preferably in the range of 100 nm to 2 microns, and more preferably, in the range of 200 nm to 500 nm. Inorganic particles having nonspherical shapes generally have a maximum dimension of less than 10 microns, preferably less than 1 microns, and more preferably less than 500 nm.

Examples of inorganic particles include filler particles, extender particles, and pigment particles. Suitable inorganic particles include zinc oxide particles, antimony oxide particles, barium oxide particles, calcium sulfate particles, zirconium oxide particles, aluminum oxide particles; chromium oxide particles, iron oxide particles, magnesium oxide particles, lead oxide particles, zinc sulfide particles, lithopone, titanium dioxide, clay particles such as kaolin and delaminated clay particles; silicon dioxide particles such as silica; talc particles; and mica particles. Preferably, the inorganic particles are titanium dioxide including rutile and anatase, and more preferably, the inorganic particles are rutile titanium dioxide.

In one embodiment, the polymer compound is a hydrophilic polymer compound useful for modifying the surface of inorganic particles to provide inorganic particles that have a greater affinity for water. Inorganic particles with surfaces modified by the hydrophilic polymer compound are more readily dispersed in an aqueous medium. For example, these inorganic particles are dispersible into water without the application of high shear mixing conditions, as is typically used to prepare aqueous dispersions of pigment, often referred to as slurries or pigment letdowns. The inorganic particles treated with the hydrophilic polymer compound of this embodiment are dispersible into an aqueous medium with the application of low shear mixing, such as stirring by hand. Further, the aqueous dispersion containing the inorganic particles with surfaces modified by the hydrophilic polymer have a reduced tendency to settle out from the aqueous medium, thus providing the aqueous pigment dispersion with improved stability and an extended shelf life. Inorganic particles treated with the hydrophilic polymer compound having acid groups or anhydride groups as the functional group, are dispersible into an aqueous medium having a pH near or above the $pK_a$ of the acid group or the acids formed by hydrolysis of the anhydride group, preferably at least one pH unit above the $pK_a$ value. Suitable pH values for dispersing inorganic particles treated with the hydrophilic polymer compound having acid groups are pH values of at least 4, preferably at least 6, and more preferably, at least 7. Inorganic particles treated with the hydrophilic polymer compound having amine or amide groups as the functional group, are dispersible into an aqueous medium having a pH near or below the $pK_b$ of the amine or the amide, preferably at least one pH unit below the $pK_b$ value. Suitable pH values for dispersing inorganic particles treated with hydrophilic polymer compound having amine or amide groups are pH values of less than or equal to 8, preferably less than or equal to 7, and more preferably, less than or equal to 6. The inorganic particles treated with the hydrophilic polymer compound having hydroxyl groups as the functional group are dispersible into an aqueous medium having a pH in the range of 1 to 14.

Examples of the hydrophilic polymer compound include:

$(CH_3O)_3Si$—$C_2H_4$—S—[poly(2-hydroxyethyl methacrylate); DP=75]

$(C_2H_5O)_2(CH_3)Si$—$C_3H_6$—S—[poly(acrylic acid); DP=55]

$(CH_3)_2(CH_3)Si$—$CH_2$—S—[poly(acrylamide); DP=92].

In the above examples, the composition of the organic polymer component is represented by the term "poly(name of monomer)" which represents the monomer contained as a polymerized unit in the organic polymer component. The term "DP" represents the degree of polymerization of the organic polymer component. The organic polymer component of the hydrophilic polymer compound optionally is a copolymer.

The hydrophilic polymer compound is also suitable as a sizing agent for glass fibers to provide better dispersibility of the treated glass fibers into water.

The examples which follow illustrate the compositions and the process of the present invention. These examples will aid those skilled in the art in understanding the present invention; however, the present invention is in no way limited thereby.

EXAMPLE 1
Preparation of Polymer Compounds

EXAMPLE 1.1
Polymer Compound Containing Pendant Aldehyde and Alcohol Functional Groups A polymer compound was prepared by first adding 75.0 g butyl acetate to a 250 ml round bottom flask equipped with a reflux condenser, magnetic stirrer, thermocouple, and a nitrogen inlet tube. The contents of the flask was swept with nitrogen and heated to 88° C. Next, 0.05 g Vazo™ 67 initiator (Vazo is a trademark of E. I. DuPont de Nemours and Co., Wilmington, Del.) in 2.5 g butyl acetate was added to the flask. A monomer mixture containing 25 g butyl acetate, 12.5 g methyl methacrylate (MMA), 12.5 g hydroxyethyl methacrylate (HEMA), and 0.77 g 3-mercaptopropyltrimethoxysilane (MPTMS) was added drop wise to the flask over a period of 30 minutes. The contents of the flask was allowed to stand for a period of 15 minutes, and then the temperature was increased to 95° C. and maintained at 95° C. for a period of 40 minutes. Next, the contents of the flask was allowed to cool to room temperature and then 55.5 g anhydrous dimethyl sulfoxide was added, followed by the addition of 4.85 g diisopropylcarbodiimide and 1.11 g pyridine-hydrochloric acid dissolved in 5 g dimethylsulfoxide. The contents of the flask was allowed to sit for a period of 72 hours. A white precipitate formed and was removed by filtration. The remaining mixture contained the polymer compound of Example 1.1 at 9.8 weight % solids. Example 1.1 was a polymer compound having a semi-telechelic group containing a trimethoxysilane moiety and an organic polymer component having pendant aldehyde groups and alcohol groups. The average composition of Example 1.1 was the polymer compound containing as reacted units: $MMA_{24.5}HEMA_{19.4}HEAMA_{6.1}MPTMS_1$, wherein HEAMA represents 2-hydroxyethanal ester of methacrylic acid and the subscripts represent the mole amount of each reacted material. The reacted MPTMS was the semi-telechelic group.

EXAMPLE 1.2
Polymer Compound Containing Pendant Acetoacetoxy Functional Groups and Pendant Hydroxyl Functional Groups The polymer compound of Example 1.2 was prepared by first adding 140 g anhydrous ethanol to a 500 ml round bottom flask equipped with a reflux condenser, magnetic stirrer, thermocouple, and a nitrogen inlet tube. The contents of the flask was swept with nitrogen and heated to 76° C.

Next, a solution containing 0.225 g Vazo™ 67 initiator in 3 g anhydrous ethanol was added to the flask. A monomer mixture containing 10 g acetoacetoxyethylmethacrylate (AAEM), 80 g hydroxyethylacrylate (HEA), and 9 g (3-mercaptopropyl)trimethoxysilane (MPTMS) was added drop wise from an addition funnel to the flask over a period of 30 minutes. The exotherm raised the temperature to 80° C. The addition funnel was rinsed with 5 g anhydrous ethanol, which was subsequently added to the flask. The reaction mixture was maintained at a temperature of 75 to 80° C. and stirred for a period of 1 hour. Next, the contents of the flask was cooled to room temperature. The flask contained a solution of the polymer compound of Example 1.2 at a solids level of 40 weight %. The average composition of Example 1.2 was the polymer compound containing as reacted units: $AAEM_1HEA_{15}MPTMS_1$. The reacted MPTMS was the semi-telechelic group.

EXAMPLE 1.3
Polymer Compound Containing Pendant Acetoacetoxy Functional Groups, Pendant Carboxylic Acid Functional Groups, and Pendant Hydroxyl Functional Groups The polymer compound of Example 1.3 was prepared according to the procedure of Example 1.2 except that the monomer mixture contained 10 g acetoacetoxyethylmethacrylate (AAEM), 70 g hydroxyethylacrylate (HEA), 10 g methacrylic acid (MAA), and 9 g (3-mercaptopropyl)trimethoxysilane (MPTMS). The average composition of Example 1.3 was the polymer compound containing as reacted units: $AAEM_1HEA_{13.1}MAA_{2.5}MPTMS_1$. The reacted MPTMS was the semi-telechelic group.

EXAMPLE 1.4
Polymer Compound Containing Pendant Acetoacetoxy Functional Groups, Pendant Phosphorus Acid Functional Groups, and Pendant Hydroxyl Functional Groups The polymer compound of Example 1.4 was prepared according to the procedure of Example 1.2 except that the monomer mixture contained 10 g acetoacetoxyethylmethacrylate (AAEM), 70 g hydroxyethylacrylate (HEA), 12 g 2-phosphoethyl methacrylate (PEM), 2 g methacrylic acid (MAA), and 9 g (3-mercaptopropyl)trimethoxysilane (MPTMS). The average composition of Example 1.4 was the polymer compound containing as reacted units: $AAEM_1HEA_{13.1}PEM_1MAA_{0.5}MPTMS_1$. The reacted MPTMS was the semi-telechelic group.

EXAMPLE 1.5
Polymer Compound Containing Pendant Acetoacetoxy Functional Groups and Pendant Hydroxyl Functional Groups The polymer compound of Example 1.5 was prepared according to the procedure of Example 1.2 except that the monomer mixture contained 20 g acetoacetoxyethylmethacrylate (AAEM), 4 g hydroxyethylacrylate (HEA), 66 g poly(ethylene glycol) methacrylate (molecular weight= 360) (PEGMA) and 9 g (3-mercaptopropyl)trimethoxysilane (MPTMS). The average composition of Example 1.5 was the polymer compound containing as reacted units: $AAEM_2HEA_{0.7}PEGMA_4MPTMS_1$. The reacted MPTMS was the semi-telechelic group.

EXAMPLE 2
Preparation of Titanium Dioxide Treated with Polymer Compound

EXAMPLE 2.1
Aqueous Dispersion Containing Titanium Dioxide Treated with the Polymer Compound of Example 1.1

Surface-treated titanium dioxide particles were prepared having attached aldehyde functional groups.

A mixture of 95 g ethanol and 5 g water was placed in grind pot. The grind pot was then placed on a Premier Mill dispersator equipped with a disk blade. To the grind pot, 400 g TiPure™ R-706 titanium dioxide (TiPure is a trademark of E. I. DuPont de Nemours and Company, Wilmington, Del.) was added with mixing. The mixture was ground at 2000 rpm for 20 minutes to disperse the titanium dioxide particles. Next, 80 g of the polymer compound solution of Example 1.1 was added, followed by the addition of 3 drops of hydrochloric acid. The mixture was ground for an additional 5 minutes. The mill speed was decreased to gentle stirring and the mixture was stirred for 25 minutes. The mixture was transferred to a plastic bucket, and the ethanol and water was allowed to evaporate at room temperature to provide titanium dioxide particles having a surface treated with the residue of the polymer compound of Example 1.1. The surface-treated titanium dioxide was functionalized with aldehyde groups.

An aqueous dispersion containing the surface-treated titanium dioxide particles of Example 2.1 was prepared by first adding 104.6 g water, 6.14 g Tamol™ 731 dispersant (Tamol is a trademark of Rohm and Haas Company, Philadelphia, Pa.), 6.94 g Colloid™ 643 dispersant (Colloid is a trademark of Allied Colloids Limited Company), and 1.14 g sodium hydroxide (50 weight % solution) to a grind pot. The contents of the grind pot were mixed using a Premier Mill dispersator equipped with a disk blade followed by the addition of 384 g of the surface-treated titanium dioxide particles of Example 2.1 The mixture was ground at 2000 rpm for 20 minutes to provide the aqueous dispersion containing the surface-treated titanium dioxide particles of Example 2.1.

EXAMPLE 2.2
Aqueous Dispersion Containing Titanium Dioxide Treated with the Polymer Compound of Example 1.2

Surface-treated titanium dioxide particles were prepared having attached acetoacetoxy functional groups and attached hydroxyl functional groups.

A mixture of 200 g ethanol and 10 g deionized water was placed in grind pot. The grind pot was then placed on a dispersator equipped with a disk blade. To the grind pot, 400 g TiPure™ R-706 titanium dioxide was added with mixing. The mixture was ground for 20 minutes to disperse the titanium dioxide particles. Next, 3 g of ammonium hydroxide was added, followed by the addition of 50 g of the polymer compound of Example 1.2. The mixture was ground for an additional 30 minutes. The mixture was allowed to dry for a period of 3 days at room temperature and then dried for 1 hour at 70° C. to remove any remaining ethanol or water. The resulting powder was mechanically crushed and screened to obtain a fine powder. An aqueous dispersion was prepared by dispersing 407 g of the fine powder into 106 g deionized water, using a dispersator. The aqueous dispersion of Example 2.2 contained surface treated titanium dioxide particles at 79.3 weight % solids.

EXAMPLE 3
Preparation of Composite Particles

EXAMPLE 3.1
Composite Particles Prepared from Reaction of Aldehyde-Functional Titanium Dioxide Particle and Acetoacetoxy-Functional Polymer Particles Composite particles were prepared by the reaction of acetoacetoxy functional polymer particles and the surface-treated titanium dioxide particles of Example 2.1, which had aldehyde-functional groups. The composite particles were prepared by adding drop wise and with mixing, 46.83 g of the aqueous dispersion containing the surface treated titanium dioxide particles of Example 2.1 to 51.44 g of Rhoshield™ 3188 polymer dispersion (Rhoshield is a trademark of Rohm and Haas Company). Rhoshield™ 3188 polymer is an acetoacetoxy-functional polymer particle dispersion supplied with 40 weight % solids and has an average particle diameter of 120 nm. The resulting mixture was placed on a roller for a period of at least 12 hours. The composite particle dispersion of Example 3.1 had a solids level of 56.6 weight %. The composite particles contained 63 weight % titanium dioxide particles and 37 weight % polymer particles.

EXAMPLE 3.2

Composite Particles Prepared from Reaction of Acetoacetoxy-Functional Titanium Dioxide Particle and Aldehyde-Functional Polymer Particles Composite particles were prepared by the reaction of aldehyde-functional polymer particles and the surface-treated titanium dioxide particles of Example 2.1, which had acetoacetoxy-functional groups.

Preparation of Aldehyde-Containing Monomer

A reaction mixture was prepared by adding 7.9 g 4-hydroxybenzaldehyde, 10 g 2-isocyanatoethylmethacrylate, 17.8 g 1,4-dioxane, and 1 drop of dibutyl tin dilaurate to a flask having a nitrogen atmosphere. The contents of the flask was mixed for two days while maintaining with the nitrogen atmosphere. The resulting solution contained 50 weight % of an aldehyde-containing monomer (ACM) having the following structure:

$$CH_2=C(CH_3)C(O)-C_2H_2-NH-C(O)O-C_6H_4C(O)H$$

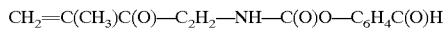

wherein the aldehyde group is in the 4-position on the aryl group.

Preparation of Aldehyde-Functional Polymer Particles

An aqueous dispersion containing aldehyde-functional polymer particles was prepared by adding 119.3 g deionized water and 2.4 g surfactant-A (lauryl-(ethylene oxide)$_4$ sodium sulfate) to a reaction flask containing a nitrogen atmosphere. The contents of the flask was heated to 85° C. Next, a mixture of 1.5 g deionized water, 0.12 g surfactant-A, 2.7 g butyl acrylate, and 2.7 g methyl methacrylate was added, followed by the addition of a mixture containing 0.3 g sodium persulfate dissolved in 2.5 g deionized water. The contents of the flask were stirred for 10 minutes. A monomer emulsion containing 32.3 g butyl acrylate (BA), 32.7 g methyl methacrylate (MMA), 1 g acrylic acid (AA), and 6.12 g of the aldehyde-containing monomer (ACM) was added to the flask over a period of 15 minutes. The contents of the flask was maintained at a temperature of 85° C. for a period of 15 minutes. Next, a solution of 0.1 g sodium persulfate in 1 g water was added. The contents of the flask was allowed to cool to a temperature of 50° C., followed by the addition of 2 g of ammonium hydroxide. The contents of the flask was allowed to cool to room temperature. The resulting aqueous dispersion contained polymer particles having an average particle diameter of 100 nm and had a solids content of 35.8 weight %. The average composition of the polymer particles, based on the weight of reacted monomers, was 45.3BA/45.3MMA/7.9ACM/1.3AA.

Composite particles were prepared by the reaction of the aldehyde functional polymer particles and the surface-treated titanium dioxide particles of Example 2.2, which had aldehyde-functional groups.

What is claimed is:

1. A polymer compound comprising:
   a) an organic polymer component comprising ethylenically unsaturated monomers as polymerized units and having at least one pendant functional group; and
   b) a semi-telechelic group having:
      i) a silicon ester moiety represented by the formula $(R^1O)_n(R^2)_{3-n}Si—$
      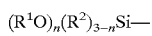

wherein each $R^1O$ is independent selected from the group consisting of methoxy, ethoxy, acryloxy, and aryloxy; $R^2$ is independently selected from organic groups comprising at least one carbon atom; and n has an integer value in the range of 1 to 3; and
      ii) a sulfur atom forming a bond to said organic polymer component.

2. The polymer compound according to claim 1 wherein said at least one pendant functional group is selected from the group consisting of carboxylic acid, anhydride, phosphorus-containing acids, sulfur-containing acids, alcohol, aldehyde, amines, amides, epoxy, halogens, acetoacetoxy groups, isothiocyanate, and isocyanate.

3. The polymer compound according to claim 1 wherein said organic polymer component has a degree of polymerization of at least 10.

4. The polymer compound of claim 1 having a degree of polymerization in the range of from 3 to 1000.

5. The polymer compound of claim 4 having a degree of polymerization in the range of from 10 to 250.

6. A process for preparing a polymer compound comprising the steps of:
   a) preparing a reaction mixture comprising at least one ethylenically unsaturated monomer having a functional group and a mercaptan compound having a silicon ester moiety, wherein said silicon ester moiety is represented by the formula $(R^1O)_n(R^2)_{3-n}Si—$
   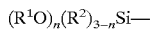

wherein each $R^1$ is independent selected from the group consisting of methoxy, ethoxy, acryloxy, and aryloxy; $R^2$ is independently selected from organic groups comprising at least one carbon atom; and n has an integer value in the range of 1 to 3; and
   b) polymerizing said reaction mixture to form said polymer compound; wherein said polymer compound comprises:
      i) an organic polymer component comprising, as polymerized units, said ethylenically unsaturated monomer having a functional group; and
      ii) a semi-telechelic group formed from said mercaptan compound, and having a sulfur atom forming a bond to said organic polymer component.

7. The process of claim 6 wherein said mercaptan compound having a silicon ester moiety is selected from the group consisting of 3-mercaptopropyl methyldimethoxysilane, mercaptomethyl methyldiethoxysilane, 3-mercaptopropyl triethoxysilane, and 3-mercaptopropyl trimethoxylsilane.

8. A surface-treated inorganic substrate comprising:
   a) an inorganic substrate having a surface; and
   b) a residue of a polymer compound comprising:
      i) an organic polymer component comprising ethylenically unsaturated monomers as polymerized units and having at least one pendant functional group; and ii) a semi-telechelic group having: a sulfur atom forming a bond to said organic polymer component, and at least one reacted silanol group forming a covalent bond with said surface of said inorganic substrate;
wherein said surface-treated inorganic substrate is selected from the group consisting of titanium dioxide, silica, zinc oxide, titanium, aluminum, zirconium, silicon, chromium, tin, iron, and lead.

9. The surface-treated inorganic substrate of claim 8 wherein said functional group is selected from the group consisting of carboxylic acid, anhydride, phosphorus-containing acids, sulfur-containing acids, alcohol, aldehyde, amines, amides, epoxy, halogens, acetoacetoxy groups, isothiocyanate, and isocyanate.

10. The surface-treated inorganic substrate of claim 8, wherein said organic polymer component has a degree of polymerization of at least 25; and said functional group is selected from the group consisting of alcohol, carboxylic acid, amines, and amides.

11. The surface-treated inorganic substrate of claim 10, wherein said inorganic substrate is selected from the group consisting of silica, titanium dioxide, and zinc oxide.

12. A surface-treated inorganic substrate comprising:
  a) an inorganic substrate having a surface, wherein said inorganic substrate is in the form of particles having an average diameter of less than 10 microns; and
  b) a residue of a polymer compound comprising:
    i) an organic polymer component comprising ethylenically unsaturated monomers as polymerized units and having at least one pendant functional group; and
    ii) a semi-telechelic group having: a sulfur atom forming a bond to said organic polymer component, and at least one reacted silanol group forming a covalent bond with said surface of said inorganic substrate.

13. The surface-treated inorganic substrate of claim 12 wherein said inorganic substrate is selected from the group consisting of titanium dioxide, silica, zinc oxide, titanium, aluminum, zirconium, silicon, chromium, tin, iron, and lead.

14. The surface-treated inorganic substrate of claim 12 wherein said functional group is selected from the group consisting of carboxylic acid, anhydride, phosphorus-containing acids, sulfur-containing acids, alcohol, aldehyde, amines, amides, epoxy, halogens, acetoacetoxy groups, isothiocyanate, and isocyanate.

15. The surface-treated inorganic substrate of claim 12 wherein said particles have a diameter in the range of from 100 nanometers to 2 microns.

16. The surface-treated inorganic substrate of claim 12 wherein said particles are selected from the group consisting of zinc oxide particles, antimony oxide particles, barium oxide particles, calcium sulfate particles, zirconium oxide particles, aluminum oxide particles, chromium oxide particles, iron oxide particles, magnesium oxide particles, lead oxide particles, zinc sulfide particles, lithopone, titanium dioxide particles, clay particles, silicon dioxide particles, talc particles; and mica particles.

* * * * *